United States Patent [19]

Kakizaki et al.

[11] Patent Number: 4,698,558

[45] Date of Patent: Oct. 6, 1987

[54] IMAGE PICKUP APPARATUS

[75] Inventors: Takehiro Kakizaki, Sagamihara; Shoji Araki, Atsugi, both of Japan

[73] Assignee: Sony Corporation, Tokyo, Japan

[21] Appl. No.: 546,732

[22] Filed: Oct. 28, 1983

[30] Foreign Application Priority Data

Oct. 29, 1982 [JP] Japan ................................. 57-190483

[51] Int. Cl.⁴ ..................... H01J 29/52; H01J 31/26; H04N 5/235
[52] U.S. Cl. ..................................... 315/383; 315/10; 315/389; 358/219
[58] Field of Search .................. 315/10, 11, 383, 389; 358/219

[56] References Cited

U.S. PATENT DOCUMENTS 4,380,028  4/1983  Pepin et al. ........................ 358/219
4,427,927  1/1984  Nakamura ......................... 358/219

Primary Examiner—Theodore M. Blum
Assistant Examiner—Gregory C. Issing
Attorney, Agent, or Firm—Lewis H. Eslinger; Alvin Sinderbrand

[57] ABSTRACT

Control circuit for use with an image pickup tube permits highlights of an image to be scanned appropriately by a scanning electron beam by increasing the beam current fed to the cathode of the image pickup tube and prevents unwanted oscillations typically found when such beam currents are increased. The control circuit first determines whether the output from the image pickup tube exceeds a predetermined level and produces a control signal to be added to the normal beam current and also uses this control signal to control a vertical deflection circuit to shift the scanning electron beam upwardly toward a region on the photoelectric transducer of the image pickup tube that has already been scanned, thereby providing negative feedback and preventing unacceptable oscillations in the output signal.

12 Claims, 13 Drawing Figures

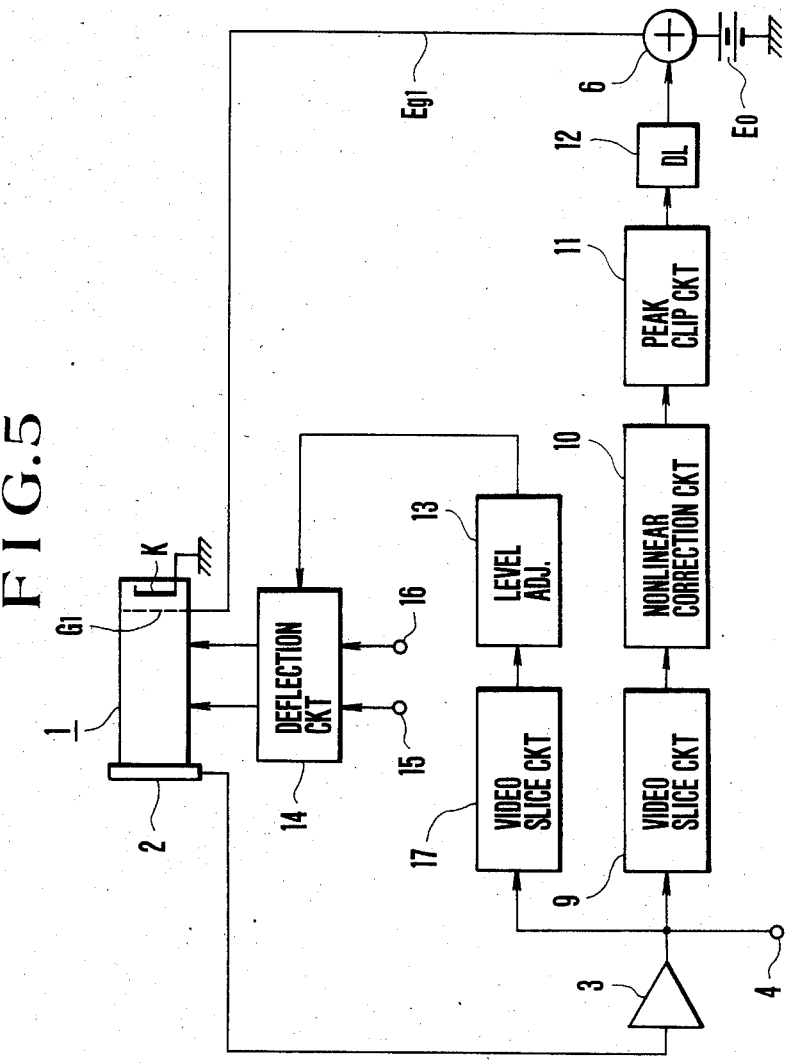
F I G. 5

IMAGE PICKUP APPARATUS

BACKGROUND OF THE INVENTION

1. Field of the Invention

The present invention relates in general to image pickup apparatus and, particularly, to a control system for automatically controlling the location and level of the scanning electron beam in such image pickup apparatus.

2. Description of the Prior Art

Image pickup tubes typically involve three major subassemblies, namely, the image section, the storage target section, and the scan section. The image section employs a photo-emissive surface and electron optics to convert an optical image into an electron image, which is then focused upon the surface of the storage target and creates a corresponding electric-charge image. The storage target integrates or stores the focused electric charge before readout and erasure by a scanning electron beam generated in the scan section. The low velocity scanning electron beam that is generated by the cathode repetitively scans the rear surface of the storage target, which corresponds to the anode, to generate a time-varying electric signal that is proportional to the magnitude of the spatial charge distribution produced by the image focused onto the front of the storage target, that is, the anode. The scanning electron beam currents in the image pickup tube serve to lower the potential created by a highlight of an optical image focused onto the storage target down to what is essentially the cathode potential. That is, the beam currents act to supply a beam of electrons which effectively neutralizes the positive charges produced on the photoelectric transducer surface, as embodied by the storage target surface. The level of the scanning electron beam current must be chosen to be sufficiently high, otherwise the scanning beam electrons will be insufficient to neutralize the charge caused by a highlight of the optical image. That is, unless the scanning electron beam has a high enough concentration of electrons it will not be sufficient to reduce the potential caused by the image highlight on the storage target to approximately the cathode level. Simply increasing the power of the beam of electrons is an unacceptable solution to this problem, since in a photoconductive image pickup tube as the beam of electrons is increased the focus of the beam is decreased and, thus, the beam falling on the storage target will be out of focus, resulting in reduced resolution. This problem is more acute in frequency-separation or phase-separation single-tube color image pickup apparatus, since the out-of-focus beam condition adversely affects color saturation, color uniformity, and the signal-to-noise ratio (S/N) of the color signals.

One proposed solution to eliminate any electron shortage in the beam scanning such highlights and to prevent deterioration of the color image quality has been to employ an automatic beam control circuit that would act to control the level of the electron beam in response to the brightness of the object to be televised, that is, the image being detected. Such proposed automatic control circuit produces an output signal current from the storage target in the image pickup tube and feeds such output signal, together with a predetermined DC voltage level, back to the first grid of the image pickup tube through means of a feedback circuit. In this system, when the output current from the image pickup tube exceeds the predetermined DC voltage level, a control voltage from the feedback circuit is added to the grid voltage, thereby increasing the beam current and avoiding any electron shortage in the scanning beam.

Nevertheless, in using this above-described automatic beam control circuit, it has been found that it tends to oscillate quite easily, and it is difficult to adjust the circuit so that both beam electron shortage and oscillation can be prevented. The cause of this oscillation has been attributed to the positive feedback loop that is present when beam electron shortage occurs.

One proposed solution to prevent this unacceptable oscillation and to permit the automatic beam control circuit to operate correctly is to require the characteristic curve representative of variations of the first grid voltage versus variations of the beam current and the characteristic curve indicative of variations of the signal current obtained through the automatic beam control circuit versus variations of the first grid voltage to be quite similar. This characteristic curve similarity requirement has proven to be difficult to meet because of the inherent circuit design, the required adjustments, and time dependency changes of the image pickup tube. Additionally, a previously proposed method to prevent these oscillations by using negative feedback of a cathode current has not proven to be effective, since the characteristic curve representative of the first grid voltage versus the cathode current is not sufficiently similar to the characteristic curve representing the first grid voltage versus the beam current. Therefore, while a solution to preventing degradation of the color image signal caused by deficiencies in the scanning beam electrons has been known, such solution causes almost as many problems as it solves.

OBJECTS AND SUMMARY OF THE INVENTION

Accordingly, it is an object of the present invention to provide an image pickup apparatus having an automatic control circuit for controlling the level and locations of the scanning electron beam so that no highlights of an image are lost due to shortages in the beam current and which does not cause unacceptable oscillations in the output signal.

It is another object of the present invention to provide an image pickup apparatus including an automatic scanning electron beam control circuit that can be readily adjusted and that prevents oscillation by use of a feedback loop utilizing a beam readout from the image pickup tube A further object is to provide an image pickup apparatus having an automatic control circuit for controlling the scanning electron beam so that the level can be increased without output signal oscillations by deflecting the beam towards a region on the target surface that was previously scanned.

In one aspect of the present invention, an image pickup apparatus comprises an automatic beam control circuit that correspondingly increases the scanning electron beam current in an image pickup tube once the output signal level from the image pickup tube exceeds a predetermined level, and in which the beam deflection circuit is also responsive to the output signal level from the image pickup tube for shifting the scanning position of the electron beam in the image pickup tube toward a region of the photoelectric storage target surface that has already been scanned in a range that is higher than the predetermined level of the output signal from the image pickup tube. Specifically, when the level of the output signal has been increased by raising of the scanning electron beam current and a corresponding enlargement of a beam spot diameter or by the displacement of the scanning beam from the desired position due to mechanical out-of-tolerance conditions of the image pickup tube, the scanning position of the electron beam is shifted vertically upwardly on the storage target in order to utilize negative feedback for suppressing the unwanted increase in output signal level.

The above, and other objects, features, and advantages of the present invention will be apparent from the following detailed description of illustrated embodiments, which is to be read in connection with the accompanying drawings, in which the same reference numerals identify the corresponding elements and parts in the several views.

BRIEF DESCRIPTION OF THE DRAWINGS

FIG. 5 is a block diagram of an image pickup apparatus according to another embodiment of the present invention;

DESCRIPTION OF THE PREFERRED EMBODIMENTS

Figure 1:
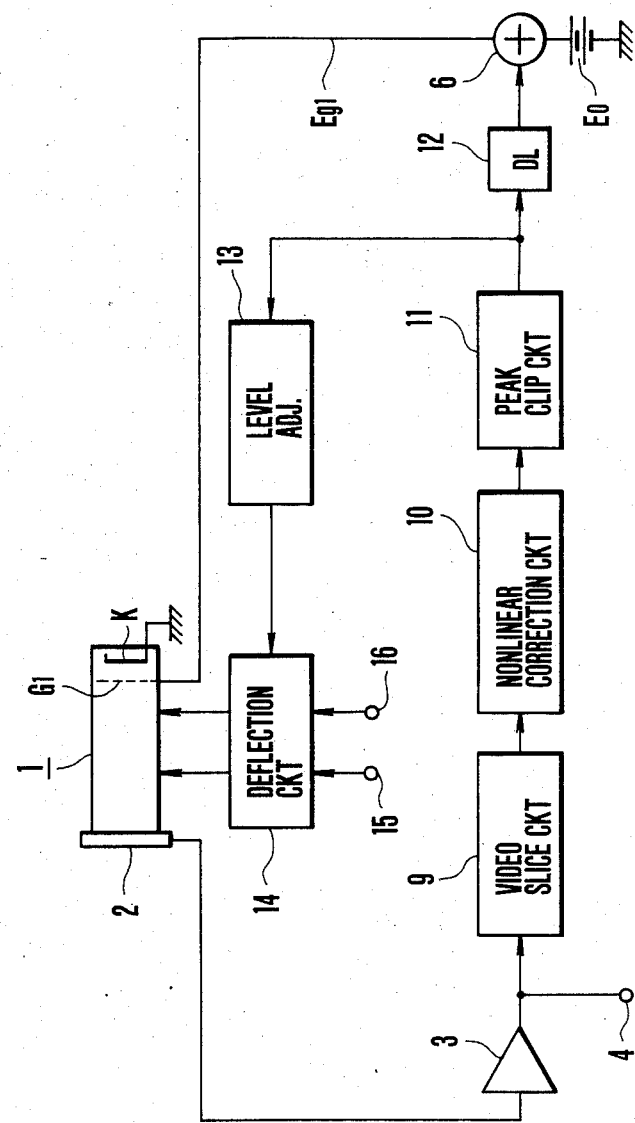
FIG. 1 is a block diagram of an image pickup apparatus according to the present invention.

In FIG. 1, a color image pickup tube 1 includes storage target 2, cathode K, and first control grid G1, which controls a beam of electrons emitted from the cathode K directed toward the rear surface of storage target 2. Although not shown, color separation filters and index electrodes composed of a transparent conductive material are mounted on the surface of storage target 2 facing the image to be detected and also included would be the standard image-forming system comprised of optical and electronic elements to direct the light reflection from the object and to produce a charge pattern on the front surface of the storage target 2. The signal indicating the image detected produced by color pickup tube 1 is fed through preamplifier 3 and is made available at output terminal 4. Additionally, the output from preamplifier 3, after undergoing signal processing to be described hereinbelow, is utilized as a feedback signal in the automatic beam control circuit by being fed as one input to signal adder 6. Signal adder 6 adds the signal voltage that has been passed through the feedback circuit to a DC signal from voltage source E0 that supplies the scanning beam current and the sum of the feedback signal and the DC voltage is the control signal Eg1 fed to first control grid G1.

The signal processing in the feedback circuit is accomplished by video slice circuit 9, nonlinear correction circuit 10, peak clip circuit 11, and delay circuit 12.

Video slice circuit 9 operates in the conventional fashion and determines an operational starting point for the automatic scanning electron beam control circuit by cancelling signal currents produced by the color image pickup tube 1 that represent low illuminance intensity from an optical image object. For example, slice circuit 9 cancels, or slices off, all currents relative to light intensities that are smaller than a selected optical image brightness, referred to as 100%-light-intensity, which produces 100% of a video signal output with respect to a reference signal. Nonlinear correction circuit 10 equalizes the characteristic curve of the first grid voltage Eg1 as it is increased by the automatic beam control circuit described herein, when the signal voltage changes to a characteristic curve of the beam current, as it varies with the first grid voltage Eg1. The peak clip circuit 11 prevents the first control grid voltage Eg1 from exceeding predetermined limits.

Figure 2:
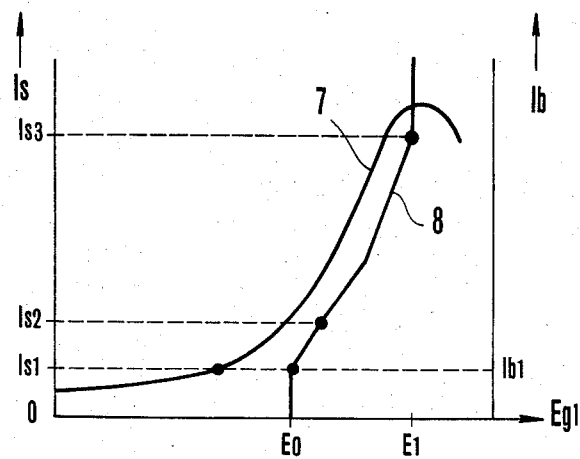
FIG. 2 is a graphical representation of the transfer characteristics of an automatic beam control circuit in the image pickup apparatus of FIG. 1.

The characteristics of the automatic scanning electron beam control circuit of FIG. 1 are represented in FIG. 2, in which the scanning electron beam current Ib is represented by curve 7, and the first grid voltage Eg1 is represented by curve 8. The beam current Ib will vary when the first grid voltage Eg1 changes and the first grid voltage Eg1 is varied when the brightness of the optical image focused on the storage target varies, as represented by signal current Is. The operation of video slice circuit 9 in the feedback of circuit is shown in FIG. 2, in that video slice circuit 9 prevents the automatic beam control circuit from operating until the video signal output from the image pickup tube 1 reaches current level Is, which is indicative of the 100%-light-intensity of the focused optical image. These are represented in relation to curve 8 of the first grid voltage Eg1. Until the time that the signal current Is reaches this 100%-light-intensity level, the first control grid voltage Eg1 remains at the constant DC voltage level E0 and during that time the scanning electron beam current Ib is at level Ib1.

The crossing of curves 7 and 8 representing the beam current and control grid voltage, respectively, indicates a shortage of electron scanning beam current, which is the problem solved by the present invention. Even with no control for the electron scanning beam current being provided and with the first control grid voltage Eg1 equal to the DC constant voltage E0, no beam shortage will take place until the signal current reaches a level Is2, which corresponds to a 200%-light-intensity level of the focused optical image.

When the optical image brightness exceeds this 100%-light-intensity level the automatic scanning electron beam control circuit according to the present invention comes into play and acts to increase the first control grid voltage Eg1 by adding to it a control voltage from the feedback loop. Thus, the scanning electron beam current Ib increases, through the action of the inventive feedback loop, to prevent any beam shortage and the attendant adverse affects described above. Nonlinear correction circuit 10 causes the first control grid voltage Eg1 to vary nonlinearly with the output signal current Is from the image pickup tube, so that the scanning electron beam current Ib will not reach an excessive level and, as seen in FIG. 2, as long as the signal current Is is greater than a level Is3, which corresponds to 800%-light-intensity of a focused optical image, the first control grid voltage Eg1 is limited to a constant level E1 by the action of the peak clip circuit 11 in the automatic scanning electron beam control circuit of FIG. 1.

Referring back to FIG. 1, the output signal from peak clip circuit 11, in addition to being used in the feedback circuit to control the first control grid current, is fed through level adjuster 13 to deflection circuit 14 that forms a part of the image pickup tube assembly 1. This deflection circuit 14 provides the necessary horizontal and vertical deflection to control the scan of the electron beam and has input terminals 15 and 16, to which are connected, respectively, the horizontal and vertical synchronizing signals. The control voltage from the automatic beam control circuit is level adjusted appropriately in level adjuster 13 and is supplied as a vertical centering control signal to deflection circuit 14. This vertical centering control signal varies the DC level of a vertical deflection current for vertically shifting the scanning position of the electron beam produced by cathode K. More specifically, the vertical centering control signal displaces the scanning electron beam upwardly, that is, toward an already scanned region, in response to the level of the control signal feedback through adder 6. Delay circuit 12 receives the output control signal from peak clipping circuit 11 and provides necessary control-loop time delays, so that beam shifting will not interfere with the desired variations in the first control grid voltage Eg1.

As indicated hereinabove, one problem relative to automatic beam control circuits has been oscillations of the control circuit. The present invention, however, is founded upon the discovery that such oscillations are not circuit oscillations but result directly from variations in the conditions with which the scanning electron beam is read out from the storage target.

Figure 3A:
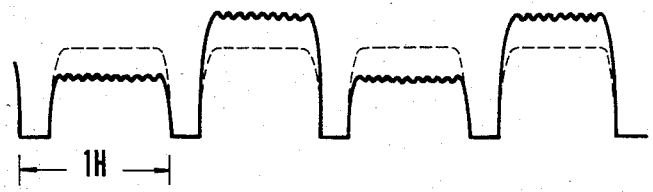
FIGS. 3A and 3B are waveform diagrams showing typical output signals exhibiting unwanted oscillation.
Figure 3B:
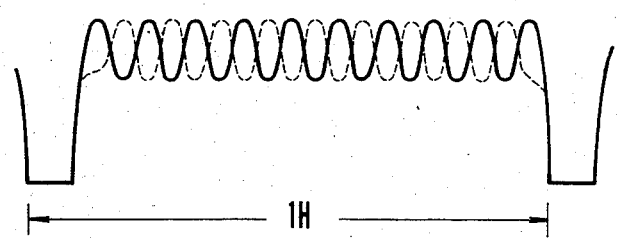

FIGS. 3A and 3B represent oscillations actually occurring in an image pickup tube apparatus employing an automatic beam control circuit. More particularly, FIG. 3A represents an image output signal that varies cyclically at intervals of one horizontal period (H) and which oscillates alternately between high and low levels. Such alternate high and low levels are represented by the solid line in FIG. 3A in relation to a constant level, corresponding to a prescribed image brightness which should be assumed by the image output, as represented by the broken line. In FIG. 3B, it is seen that the output signals are further subjected to high-frequency oscillations within each horizontal scan period (H), and it has been found that these high-frequency oscillations in successive horizontal periods are 180° out of phase with each other, as represented by the solid and broken lines in FIG. 3B.

Figure 4A:
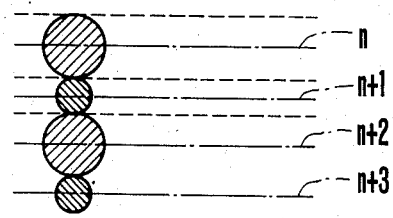
FIGS. 4A through 4E are diagramatic representations of scanning electron beam spots illustrative of the causes of the unwanted oscillations of FIGS. 3A and 3B.

The present invention involves the discovery that the unwanted oscillations are caused by a combination of variations in the diameter of the scanning electron beam and vertical/horizontal displacement of the scanning position of this electron beam. Referring then to FIG. 4A, and assuming that these patterns are produced by an automatic beam control circuit that does not have the benefit of the present invention, when a beam current increases due to a brighter optical image focused onto the storage target and the scanning electron beam is centered on an nth line, the beam spot diameter will be increased in proportion to the increase in beam current. Therefore, assuming that the cross-hatched circle centered on line n represents a beam spot of such increased diameter, as the beam scans along line n a region in the form of a stripe, having a width equal to the beam spot diameter, will be scanned and the charges in this stripe region on the storage target will be neutralized. This enlarged beam spot diameter will cause a wider region to be read out than would otherwise be the case and, thus, causes the level of signal current produced by scanning the nth line to be increased. The next successive line represented as n+1 starts to be scanned with a beam spot diameter that is the same but produces a reduced signal current because of the larger width of the stripe region which had been scanned along the previous line n. Thus, the automatic beam control circuit as known heretofore operates to lower the beam current thereby reducing the beam spot diameter and resulting in a corresponding reduction in the width of the stripe region scanned along n+1 line. The next successive line, n+2, will have a wider nonscanned region as a result of the narrow stripe of the preceding scan, hence, the beam spot diameter is increased by the automatic beam control circuit in order to scan the n+2 line. This repeated increasing and decreasing of the beam spot diameter on a line-by-line basis will result in the variations in the level of the output signal over each successive horizontal scan, as represented by the various pulse heights shown in FIG. 3A and produces the unacceptable large-scale low-frequency oscillations.

Figure 4B:
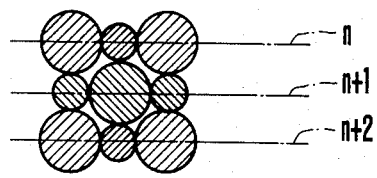

The high-frequency oscillations during one horizontal scanning period, shown generally in FIG. 3A and in detail in FIG. 3B, are caused when a conventional automatic beam control circuit causes the beam spot diameter to be successively increased and decreased during the scan of a single line. This is represented in FIG. 4B in which excessive charges in one region must be neutralized by a beam spot of increased diameter, with the result that the next beam spot diameter will be reduced, followed by an increased beam spot diameter. On the next successive line (n+1), those beam spot diameters directly below the enlarged beam spot diameters on the next preceding line (n) must accordingly be reduced because the charge at the location has been reduced by such larger diameter spot. Therefore, the oscillations take place 180° out of phase in relation to adjacent successive horizontal scan lines.

Figure 4C:
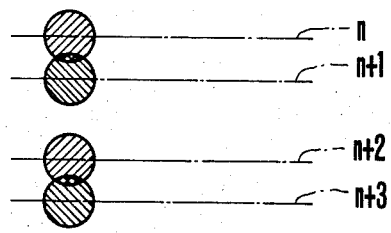

Theoretically, when the voltage Eg1 of the first control grid changes, only the crossover point of the electron beam on the tube axis should vary. Nevertheless, if the first control grid G1 has dimensional or positional errors, the angle at which the electron beam is emitted through a small aperture formed in a second control grid will be changed. This angular change causes the scanning position of the electron beam to be displaced horizontally or vertically, when the first control grid Eg1 is varied by the automatic beam control circuit. Assuming for this example that when the voltage on the first control grid Eg1 is increased the scanning position of the beam is shifted upwardly from a normal position and assuming that the nth line has been scanned by the electron beam in the normal position and that such scanning produced a large signal current. Thus, the first control grid voltage Eg1 will be increased for scanning the next line (n+1), whereupon the scanning position of the beam centered on the n+1 line will be shifted upwardly, in accordance with the above and as represented in FIG. 4C. Moreover, the output signal current will be reduced, since a portion of the region scanned by this beam along line n+1 has already been read out by the beam tracking centered on the nth line and, therefore the control grid voltage Eg1 will be decreased for the beam centered on the next successive line (n+2), so that the scanning position of the electron beam on the n+2 line will approach the normal position. As shown in FIG. 4C, a completely nonscanned region is then scanned by the electron beam centered on line n+2, thereby generating a higher signal current so that upon scanning the next line by the beam centered on line n+3 once again the beam will be displaced upwardly, exactly as it was when scanning line n+1. This upward and downwardly shifting of the scanning position is cyclical and produces output signals that have alternately higher and lower levels leading to the higher and lower alternate levels of the output signal illustrated in FIG. 3A.

Figure 4D:
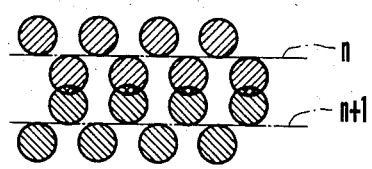

This phenomenom relative to the vertical shifts of the scanning position of the electron beam has also been found to be present during the scanning of a single line. Specifically, referring to FIG. 4D, when the electron beam spot on the n+1 line is displaced upwardly it approaches or overlaps the region which had been previously read out on the nth line, and the signal current generated when scanning the n+1 line at that particular point is reduced. The first control grid voltage Eg1 is then reduced accordingly to lower the position of the beam spot away from the region that had been read out on the nth line and thereby increase the signal current and, once the first grid control voltage signal Eg1 is increased, the position of the beam spot will be returned to its upward position. This up-and-down vertical shifting movement is repeated so that the resultant high-frequency oscillations are 180° out of phase with each other on adjacent lines, as represented in FIG. 3B.

Figure 4E:

Such high-frequency oscillation is also caused when the scanning position of the electron beam is shifted horizontally in time as the first control grid voltage Eg1 is varied. Specifically, as shown in FIG. 4E, when the beam spot is shifted horizontally alternate regions that have not yet been read out are then repetitively read out in partially overlapping relationship with regions that have already been read out and, thus, the operation of the automatic beam control circuit known heretofore will increase the beam current and vary the spot diameter or the spot scanning position, thereby causing the electron beam to read excess signals in a region other than the region to be read out. This also has been found to be a contributing factor to the high-frequency oscillation discussed in detail hereinabove.

Thus, in the embodiment according to the present invention as shown in FIG. 1, the control feedback voltage applied as the vertical centering control signal to deflection circuit 14 acts to shift the scanning position of the scanning electron beam to the region which has already been scanned in response to the level of the control voltage. This shifting will prevent the electron scanning beam from reading out excess signals in regions other than the actual region to be read out, thereby avoiding the undesirable high-frequency oscillation.

Referring now to FIG. 5 a block diagram of a image pickup apparatus according to another embodiment of the present invention is represented. Preamplifier 3 once again provides an output signal at terminal 4, as well as an input to video slice circuit 9, as described in relation to the embodiment of FIG. 1, and further provides an input to second video slice circuit 17 whose output is fed to level adjuster 13 connected to provide the vertical centering control signal to deflection circuit 14. Second video slice circuit 17 determines the magnitude of the signal current at which the beam shifting operation is to be commenced and, thus, second video slice circuit 17 can determine the signal current magnitude sufficient to start the video shifting operating independently of the automatic beam control circuit, in contrast to the embodiment of FIG. 1 in which the vertical control centering signal was derived from the output of the peak clipping circuit 11 in the main feedback loop.

Figure 6A:
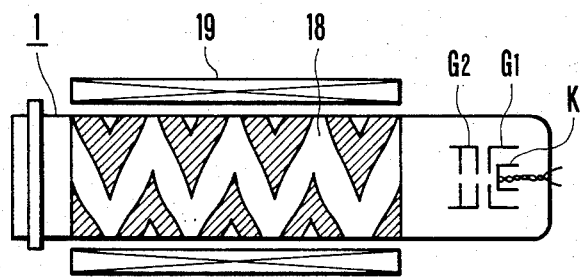
FIG. 6A is a diagramatic representation of the pickup tube for use in the present invention.
Figure 6B:
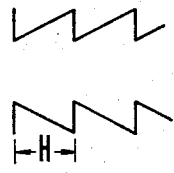
FIGS. 6B and 6C are waveform diagrams of signals employed in the pickup tube of 6A.
Figure 6C:
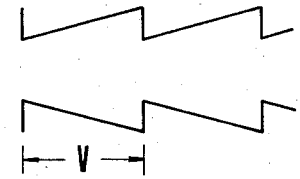

The color image pickup tube 11 of FIGS. 1 and 5 is shown in more detail in FIG. 6A and has associated therewith deflection electrodes 18 in the form of conductive films deposited by vacuum evaporation on an inner wall of tube 1 which act to electrostatically deflect a beam of electrons emitted from the cathode K. This beam of electrons is electro-magnetically focused by focus coil 19 arranged adjacent the color image pickup tube 1. The vertical deflection electrodes of the deflection electrodes 18 are shown cross hatched and horizontal deflection electrodes are open in FIG. 6A. Connected to the vertical and horizontal electrodes are horizontal and vertical sawtooth voltages, the waveforms of which are illustrated in FIGS. 6B and 6C, respectively. The opposing ones of the horizontal and vertical deflection electrodes are supplied, respectively, with the sawtooth voltages that are 180° out of phase with each other, as represented in FIGS. 6B and 6C following the known double-deflection system.

The image pickup apparatus described hereinabove relative to the present invention may also be used in combination with an image pickup tube that has an electromagnetic focusing and deflection system, in contrast to the electrostatic system described hereinabove. Additionally, image pickup tube 1 can be provided with electrodes or coils to shift or drive the scanning beam of electrons in order to prevent beam currents from being excessively high.

Although illustrated embodiments of the present invention have been described above with reference to the accompanying drawing, it will be apparent that the invention is not limited to those precise embodiments, and that various changes and modifications can be effected therein by one skilled in the art without departing from the spirit and scope of the invention, as defined by the appended claims.

What is claimed is:

1. Image pickup apparatus, comprising:
    a source of electron beam current;
    pickup tube means havng a photoelectric transducer surface and a cathode connected to said source of electron beam current for producing an output signal representing an image by scanning said photoelectric transducer surface with an electron beam produced by said cathode;
    deflection means arranged adjacent said tube means for controlling the direction of scanning of said electron beam during production of said output signal and including vertical centering control means for vertically shifting the scanning position of said electron beam on said photoelectric transducer surface; and
    control means receiving said output signal for producing first and second control signals therefrom when said output signal exceeds a predetermined level and including a nonlinear correction circuit for varying said first and second control signals nonlinearly in response to known transfer characteristics of said photoelectric transducer surface, a varied first control signal being fed to said cathode for increasing the beam current thereto and a varied second control signal being fed to said vertical centering control means in said deflection means for causing said deflection means to shift vertically upwardly said electron beam produced by said cathode toward a region on said photoelectric transducer surface already scanned by said electron beam.

2. Apparatus according to claim 1, in which said control means includes peak clipping means for limiting said first and second control signals to a constant level.

3. Apparatus according to claim 2, in which said second control signal is derived from an output of said peak clipping means.

4. Apparatus according to claim 1, further comprising level adjusting means for adjusting the level of said second control signal and feeding said level adjusted signal to said deflection means.

5. Apparatus according to claim 1, in which said control means includes a video slice circuit receiving said output signal for comparison with a predetermined voltage and producing said first and second control signals only upon said output signal exceeding said predetermined voltage.

6. Image pickup apparatus, comprising:
  a beam current source;
  pickup tube means having a photoelectric transducer surface and a cathode, said beam current source connected to supply a beam current sigal to said cathode to produce a scanning electron beam on said photoelectric transducer surface for producing an output signal representing an image focused thereon;
  deflection means for shifting the scanning position of said scanning electron beam during production of an image output signal and including vertical centering control means for vertically shifting the scanning position of said electron beam; and
  control means receiving said output signal and producing first and second control signals therefrom and including a nonlinear correction circuit for varying said first and second control signals nonlinearly in accordance with response transfer characteristics of said photoelectric transducer surface, a first nonlinearly varied control signal being added to said beam current signal for increasing the intensity of said scanning electron beam and a second nonlinearly varied control signal being fed to said vertical centering control means in said deflection means for shifting the scanning position of said electron beam vertically upward toward a region of said photoelectric transducer surface that has already been scanned.

7. Apparatus according to claim 6, in which said control means includes peak clipping means for limiting said first control signal to a constant level.

8. Apparatus according to claim 7, in which said second control signal is derived from an output of said peak clipping means.

9. Apparatus according to claim 6, in which said control means includes a video slice circuit receiving said output signal for comparison with a predetermined voltage and producing said first control signal only upon exceeding said first predetermined voltage.

10. Image pickup apparatus comprising:
  an image pickup tube having a cathode connected to receive a beam current and producing an electron beam scanning the rear surface of a photoelectric transducer for producing an output signal representing an image focused on the front surface of said photoelectric transducer;
  a deflection circuit cooperating with said image pickup tube for shifting said electron beam during production of an image output signal in response to signals input thereto and including a vertical centering control means for vertically shifting the scanning position of said electron beam; and
  beam current and deflection control means connected to receive said output signal for producing a beam current control signal and a deflection control signal therefrom upon said output signal exceeding a predetermined level and including a nonlinear correction circuit for varying said beam current control signal and said deflection control signal nonlinearly in accordance with response transfer characteristics of said photoelectric transducer surface, a varied beam current control signal being added to said beam current fed to said cathode for increasing the intensity of said electron beam and a varied deflection control signal being fed to said vertical centering control means in said deflection circuit for causing said deflection circuit to shift said electron beam scanning the rear surface of said photoelectric transducer vertically upward toward a region of said photoelectric transducer that has already been scanned by said electron beam.

11. Apparatus according to claim 10, in which said beam current and deflection control means includes a video slice circuit for comparing said output signal with a predetermined voltage and producing said beam current control signal upon said output signal exceeding said first predetermined voltage.

12. Apparatus according to claim 10, further comprising signal adder means for adding said beam control signal and said beam current.

* * * * *